United States Patent [19]

Jow et al.

[11] Patent Number: 5,482,990
[45] Date of Patent: Jan. 9, 1996

[54] FLAME RETARDANT COMPOSITIONS

[75] Inventors: Jinder Jow, Branchburg; David Gomolka, Manalapan, both of N.J.

[73] Assignee: Union Carbide Chemicals & Plastics Technology Corporation, Danbury, Conn.

[21] Appl. No.: 373,591

[22] Filed: Jan. 17, 1995

[51] Int. Cl.$^6$ .................................................. C08K 3/22
[52] U.S. Cl. ..................... 524/436; 524/425; 524/427; 524/437; 174/110 SR
[58] Field of Search ................................. 524/437, 493, 524/427, 425, 436

[56] References Cited

U.S. PATENT DOCUMENTS

| | | | |
|---|---|---|---|
| 3,832,326 | 8/1974 | North et al. | 260/42.29 |
| 4,434,261 | 2/1984 | Brugel et al. | 524/437 |
| 4,446,254 | 5/1984 | Nakae et al. | 524/437 |
| 4,617,338 | 10/1986 | Keogh et al. | 524/437 |
| 4,661,537 | 4/1987 | Ancker et al. | 524/437 |
| 4,722,858 | 2/1988 | Harbourne et al. | 524/437 |
| 4,722,959 | 2/1988 | Inoue et al. | 524/437 |
| 4,732,939 | 3/1988 | Hoshi et al. | 524/437 |
| 4,839,412 | 6/1989 | Harrell et al. | 524/437 |
| 4,845,146 | 7/1989 | Inoue et al. | 524/437 |
| 4,847,317 | 7/1989 | Dokurno et al. | 524/437 |
| 4,851,463 | 7/1989 | Opsahl et al. | 524/437 |
| 4,983,742 | 1/1991 | Yasawa et al. | 524/437 |
| 5,002,996 | 3/1991 | Okuda et al. | 524/437 |
| 5,032,321 | 7/1991 | Breant | 252/609 |
| 5,036,266 | 11/1991 | McRae | 524/437 |
| 5,094,781 | 3/1992 | Miyata et al. | 524/437 |
| 5,104,920 | 4/1992 | Keogh | 524/437 |
| 5,159,006 | 10/1992 | Breant | 524/436 |
| 5,166,250 | 11/1992 | Breant | 524/437 |
| 5,177,138 | 1/1993 | Moriyama et al. | 524/437 |
| 5,412,012 | 5/1995 | Horwatt et al. | 524/437 |

*Primary Examiner*—Veronica P. Hoke
*Attorney, Agent, or Firm*—Saul R. Bresch

[57] ABSTRACT

A composition comprising:

(a) one or more crosslinked ethylene/vinyl acetate copolymers, each copolymer having a vinyl acetate content in the range of about 10 to about 40 percent by weight based on the weight of the copolymer and an average melt index in the range of about 1 to about 50 grams per 10 minutes; and, for each 100 parts by weight of component (a), (b) as a coupling agent, about 5 to about 85 parts by weight of an olefin-acrylate terpolymer containing about 0.5 to about 5 parts by weight of an anhydride of an unsaturated diacid per 100 parts by weight of polyolefin incorporated into the polyolefin through copolymerization; and (c) about 135 to about 370 parts by weight of a hydrated inorganic flame retardant filler.

9 Claims, No Drawings

FLAME RETARDANT COMPOSITIONS

TECHNICAL FIELD

This invention relates to flame retardant compositions containing an ethylene copolymer(s) and a hydrated inorganic flame retardant filler. The compositions are useful in the insulation and jacketing of electrical conductors, particularly in shipboard and other vehicular applications, and communications media such as fiber optics cable.

BACKGROUND INFORMATION

A typical cable is constructed of metal conductors insulated with a polymeric material. These insulated conductors are generally twisted to form a core and are protected by another polymeric sheath or jacket material. In certain cases, added protection is afforded by inserting a wrap between the core and the sheath. A typical fiber optics cable can be made up of one or more glass fibers.

A particular cable useful in shipboard and other vehicular applications is referred to as a tray cable. The "tray" is simply a support for one or usually several cables. It is used in cases where the cable(s) cannot be elevated as on poles or towers or buried in the ground. The tray can be in the form of a conduit having, for example, a cylindrical or box-like shape, and containing a one or more cables.

In order to pass certain vertical flame tests such as Institute of Electrical and Electronics Engineers (IEEE) Standard 383 and Underwriters Laboratories (UL)-1685, the insulation or jacketing compositions for tray cables, which are typically non-halogen, flame retardant crosslinked compositions, are usually formulated with at least 55 percent by weight of hydrated inorganic fillers (also referred to as hydrated mineral fillers or metal hydrates). At such a high filler loading level, these compositions are extremely viscous, which detracts from various of their properties, most notably flexibility, tear strength, and their resistance to hydrocarbon and other machine fluids used on ships and other vehicles such as lubricants, hydraulic fluids, turbine fuels, and diesel fuels.

Silanes are often used as coupling agents between fillers and polymeric material to enhance property performance at a sacrifice in tear strength, and ethylene/vinyl acetate (EVA) copolymers are typically used as the polymeric material in flame retardant compositions due to their high filler acceptability and flexibility, but are also deficient in tear strength. In addition, the EVA copolymers have poor fluid resistance. In sum, the EVA copolymer/silane coupling agent/hydrated mineral filler combination is found to provide high filler acceptability and flexibility, but relatively low fluid resistance and tear strength. It is further found that the more hydrated filler present in this combination, the better the flame retardancy, which would be expected; however, there is a corresponding decline in processability.

DISCLOSURE OF THE INVENTION

An object of this invention, therefore, is to provide a flame retardant composition, which is useful in both cable insulation and jacketing, particularly in tray cables, and has high filler acceptability, and relatively high tear strength, flexibility, fluid resistance, and processability, and, of course, can pass the required vertical flame test for tray cables. Other objects and advantages will become apparent hereinafter.

According to the present invention the above object is met by a composition comprising:

(a) one or more crosslinked ethylene/vinyl acetate copolymers, each copolymer having a vinyl acetate content in the range of about 10 to about 40 percent by weight based on the weight of the copolymer and an average melt index in the range of about 1 to about 50 grams per 10 minutes; and, for each 100 parts by weight of component (a), (b) as a coupling agent: about 5 to about 85 parts by weight of a polyolefin containing about 0.5 to about 5 parts by weight of an anhydride of an unsaturated diacid per 100 parts by weight of polyolefin incorporated into the polyolefin through copolymerization or grafting; and (c) about 135 to about 370 parts by weight of a hydrated inorganic flame retardant filler.

DESCRIPTION OF THE PREFERRED EMBODIMENT

Copolymers comprised of ethylene and vinyl acetate are well known, and can be prepared by conventional high pressure techniques. The portion of the copolymer attributed to the vinyl acetate comonomer can be in the range of about 10 to about 40 percent by weight based on the weight of the copolymer, and is preferably in the range of about 15 to about 35 percent by weight.

The average melt index of the EVA copolymers can be in the range of about 1 to about 50 grams per 10 minutes. The melt index is determined in accordance with ASTM D-1238, Condition E, measured at 190° C. Where only one EVA copolymer is used the average melt index is simply that of the single EVA copolymer. In the case of two or more EVA copolymers the melt indices of the copolymers are averaged with the average melt index being in the aforementioned range. It is preferred to use two EVA copolymers.

The EVA copolymers are crosslinked in a conventional manner, usually with an organic peroxide, examples of which are mentioned below in connection with grafting. The amount of crosslinking agent used can be in the range of about 0.5 to about 4 parts by weight of organic peroxide for each 100 parts by weight of EVA copolymer, and is preferably in the range of about 1 to about 3 parts by weight. Crosslinking can also be effected with irradiation or moisture, or in a mold, according to known techniques. A coupling agent is a chemical compound, which chemically binds polymeric components to inorganic components. This is effected by a chemical reaction taking place at the temperatures under which the formulation is compounded, about 70° C. to about 180° C. The coupling agent generally contains an organofunctional ligand at one end of its structure which interacts with the backbone of the polymeric component and a ligand at the other end of the structure of the coupling compound which attaches through reaction with the hydroxyl groups on the surface of the filler. In this invention, the coupling agent is an anhydride of an unsaturated aliphatic diacid incorporated into a polyolefin through copolymerization or grafting, and it couples component (a), i.e., the EVA copolymer(s), with component (c), i.e., the hydrated filler.

These anhydrides can have 4 to 20 carbon atoms and preferably have 4 to 10 carbon atoms. Examples of anhydrides, which are useful in this invention, are maleic anhydride, itaconic anhydride, and nadic anhydride. The preferred anhydride is maleic anhydride. Excess anhydride, if present after grafting, can be removed by devolatilization at temperatures in the range of about 200° C. to, about 250° C.

The polyolefins to which the anhydrides are grafted can be homopolymers or copolymers. As noted, the anhydrides can also be incorporated into the polyolefins by copolymerization with one or more comonomers. The primary comonomer is preferably ethylene; secondary comonomers are preferably vinyl acetate or an alkyl acrylate (also referred to as acrylic acid esters). All of the polymers are non-halogenated. The monomers useful in the production of these homopolymers and copolymers can have 2 to 20 carbon atoms, preferably have 2 to 12 carbon atoms, and most preferably 2 to 8 carbon atoms. Examples of these monomers are alpha-olefins such as ethylene, propylene, 1-butene, 1-hexene, 4-methyl-1-pentene, and 1-octene; vinyl acetate, ethyl acrylate, methyl acrylate, methyl methacrylate, t-butyl acrylate, n-butyl acrylate, n-butyl methacrylate, 2-ethylhexyl acrylate, and other alkyl acrylates or acrylic esters; diolefins such as 1,4-pentadiene, 1,3-hexadiene, 1,5-hexadiene, 1,4-octadiene, and ethylidene norbornene, commonly the third monomer in a terpolymer; other monomers such as styrene, p-methyl styrene, alpha-methyl styrene, vinyl naphthalene, and similar aryl olefins; nitriles such as acrylonitrile and methacrylonitrile; vinyl methyl ketone, vinyl methyl ether, and acrylic acid, methacrylic acid, and other similar unsaturated acids.

Preferred coupling agents are ethylene/acrylic acid ester/dicarboxylic acid anhydride terpolymers preferably having an acrylic ester content preferably in the range of about 5 to about 35 percent by weight and a dicarboxylic acid grafted EVA copolymer having a vinyl acetate content preferably in the range of about 15 to about 35 percent by weight.

The copolymerization of one or more comonomers with the anhydride is conventional. Processes for copolymerization are described in Maleic Anhydride, Trivedi et al, Plenum Press, New York, 1982, pages 269 to 478.

The grafting is accomplished by using an organic peroxide catalyst, i.e., a free radical generator, such as dicumyl peroxide; lauroyl peroxide; benzoyl peroxide; tertiary butyl perbenzoate; di(tertiary-butyl)peroxide; cumene hydroperoxide; 2,5-dimethyl-2,5-di(t-butyl-peroxy)hexyne-3; 2,5-dimethyl-2,5-di(t-butyl-peroxy)hexane; tertiary butyl hydroperoxide; isopropyl percarbonate; and alpha,alpha'-bis(tertiarybutylperoxy)diisopropylbenzene. In an extruder or other reaction vessel, the organic peroxide catalyst can be added to the polyolefin together with the anhydride. Grafting temperatures can be in the range of about 100 to about 300° C. and are preferably in the range of abut 150° to about 200° C.

A typical procedure for grafting maleic anhydride onto a polyolefin is described in U.S. Pat. No. 4,506,056.

Grafting can also be accomplished by adding a solution of anhydride, an organic peroxide catalyst, and an organic solvent to the polyolefin in particulate form. The organic peroxide catalyst is soluble in the organic solvent. Various organic solvents, which are inert to the reaction, can be used. Examples of useful organic solvents are acetone, methyl ethyl ketone, methyl propyl ketone, 3-pentanone, and other ketones. Other carrier solvents which allow solubilization of peroxide and anhydride, and which strip off well under appropriate devolatilization conditions may be used. Acetone is a preferred solvent because it acts as a stripping agent for residuals such as non-grafted anhydride or anhydride by-products.

The anhydride solution can contain about 10 to about 50 percent by weight anhydride; about 0.05 to about 5 percent by weight organic peroxide catalyst; and about 50 to about 90 percent by weight organic solvent based on the total weight of the solution. A preferred solution contains about 20 to about 40 percent anhydride; about 0.1 to about 2 percent peroxide; and about 60 to about 80 percent solvent.

The anhydride modified polyolefin can contain about 0.5 to about 5 parts by weight of anhydride per 100 parts by weight of polyolefin and preferably contains about 1 to about 4 parts by weight of anhydride per 100 parts by weight of polyolefin, and the flame retardant composition can contain about 5 to about 85 parts by weight of anhydride modified polyolefin per 100 parts by weight of EVA copolymer(s), and preferably about 10 to about 30 parts by weight.

The hydrated inorganic flame retardant filler is conventional. These fillers can also be referred to as metal hydrates. Examples are magnesium hydroxide, alumina trihydrate, hydrated calcium silicate(s), hydrated calcium carbonate(s), and basic magnesium carbonate(s).

A preferred magnesium hydroxide has the following characteristics: (a) a strain in the <101> direction of no more than $3.0 \times 10^{-3}$; (b) a crystallite size in the <101> direction of more than 800 angstroms; and (c) a surface area, determined by the BET method, of less than 20 square meters per gram.

The preferred magnesium hydroxide and a method for its preparation are disclosed in U.S. Pat. No. 4,098,762. A preferred characteristic of the magnesium hydroxide is that the surface area, as determined by the BET method, is less than 10 square meters per gram.

The amount of hydrated filler used in the composition can be in the range of about 135 to about 370 parts by weight of hydrated filler per 100 parts by weight of component (a), i.e., the EVA copolymer(s), and is preferably present in the range of about 150 to about 350 parts by weight of hydrated filler per 100 parts by weight of EVA copolymer(s), about 180 to about 225 parts being the optimum.

The hydrated filler can be surface treated with a saturated or unsaturated carboxylic acid having about 8 to about 24 carbon atoms and preferably about 12 to about 18 carbon atoms or a metal salt thereof. Mixtures of these acids and/or salts can be used, if desired. Examples of suitable carboxylic acids are oleic, stearic, palmitic, isostearic, and lauric; of metals which can be used to form the salts of these acids are zinc, aluminum, calcium, magnesium, and barium; and of the salts themselves are magnesium stearate, zinc oleate, calcium palmitate, magnesium oleate, and aluminum stearate. The amount of acid or salt can be in the range of about 0.1 to about 5 parts of acid and/or salt per one hundred parts of metal hydrate and is preferably about 0.25 to about 3 parts per one hundred parts of metal hydrate. The surface treatment is described in U.S. Pat. No. 4,255,303. The acid or salt can be merely added to the composition in like amounts rather than using the surface treatment procedure, but this is not preferred.

Conventional additives, which can be introduced into the thermoplastic resin formulation, are exemplified by antioxidants, ultraviolet absorbers or stabilizers, antistatic agents, pigments, dyes, nucleating agents, reinforcing fillers or polymer additives, slip agents, plasticizers, processing aids, lubricants, viscosity control agents, tackifiers, anti-blocking agents, surfactants, extender oils, metal deactivators, water tree growth retardants, voltage stabilizers, additional flame retardant additives, and smoke suppressants. Fillers and additives can be added in amounts ranging from less than about 0.1 to more than about 200 parts by weight for each 100 parts by weight of the base resin, in this case, the EVA copolymer(s).

Examples of antioxidants are: hindered phenols such as tetrakis[methylene(3,5-di-tert-butyl-4-hydroxyhydrocinnamate)]methane and thiodiethylene bis(3,5-di-tert-butyl-4-hydroxy)hydrocinnamate; phosphites and phosphonites such as tris(2,4-di-tert-butylphenyl)phosphite and di-tert-butylphenylphosphonite; various amines such as polymerized 2,2,4-trimethyl-1,2-dihydroquinoline; and silica. Antioxidants are used in mounts of about 1 to about 5 parts by weight per 100 parts by weight of EVA copolymer(s).

The advantages of the flame retardant composition of the invention are that it has high filler acceptability and processability, and, in the form of insulation or jacketing, has relatively high tear strength, flexibility, and resistance to hydrocarbon and other machine fluids and can pass the required vertical flame test(s) for tray cables.

Patents and other publications mentioned in this specification are incorporated by reference herein.

The invention is illustrated by the following examples.

EXAMPLES 1 to 4

Examples 1 and 2 show the difference between conventional silane coupling agents and maleated polyolefins as coupling agents in highly filled crosslinked EVA resins. Compositions formulated with the maleated polyolefins pass the vertical flame tray cable test at the lower LOI (limited oxygen index) and tear strength required for Navy tray cable jackets (minimum 35 pounds per inch); pass the tear strength test; and exhibit significantly improved flexibility. The silane coupling agent formulations do not pass the vertical flame test, nor do they pass the tear strength test. Both formulations do provide adequate processability and other useful properties.

Example 3 demonstrates that processability and flexibility can be improved by using a blend of two EVA resins. Example 4 illustrates the use of an ethylene/acrylic ester/ maleic anhydride terpolymer as the coupling agent.

Resins, coupling agent, and other components used in the examples are as follows:

EVA I=an ethylene/vinyl acetate copolymer having a melt index of 6 grams per 10 minutes and a vinyl acetate content of 28 percent by weight based on the weight of the EVA.

EVA II=an ethylene/vinyl acetate copolymer having a melt index of 40 grams per 10 minutes and a vinyl acetate content of 33 percent by weight based on the weight of the EVA.

EVA III=an ethylene/vinyl acetate copolymer having a melt index of 2.5 grams per 10 minutes and a vinyl acetate content of 18 percent by weight based on the weight of the EVA.

Silane coupling agent=gamma-methacryloxypropyltrimethoxysilane.

Maleated EVA=a copolymer of ethylene and vinyl acetate having maleic anhydride grafted thereto in an amount of I percent by weight based on the weight of the EVA. The grafted copolymer has a melt index of 20 grams per 10 minutes and a vinyl acetate content of 33 percent by weight based on the weight of the EVA.

Maleated terpolymer=an ethylene/acrylic ester/maleic anhydride terpolymer containing 19 percent by weight acrylic acid ester and 3 to 4 percent by weight maleic anhydride, both based on the weight of the terpolymer. The terpolymer has a melt index of 7 grams per 10 minutes.

Alumina trihydrate=hydrated filler.

Antioxidant=tetrakis[methylene(3,5-di-tert-butyl-4-hydroxyhydrocinnamate)] -methane.

Crosslinking agent=dicumyl peroxide.

Crosslinking booster=trimethylolpropane trimethacrylate ester. Variables and results are set forth in the following Table:

TABLE

| | | Examples | | | |
|---|---|---|---|---|---|
| | | 1 | 2 | 3 | 4 |
| | | | parts by weight | | |
| Components | density (g/cc) | | | | |
| EVA I | 0.93 | 81.58 | 100.00 | — | — |
| EVA II | 0.96 | 18.42 | — | 66.77 | 66.67 |
| EVA III | 0.93 | — | — | 33.23 | 33.23 |
| Silane | 0.96 | 2.64 | — | — | — |
| Maleated copolymer | 0.96 | — | 25.81 | 25.81 | — |
| Maleated terpolymer | 0.95 | — | — | — | 25.81 |
| Alumina trihydrate | 2.42 | 155.27 | 190.32 | 190.32 | 190.32 |
| Lubricant | 1.15 | 2.63 | 3.23 | 3.23 | 3.23 |
| Antioxidant | 1.20 | 1.32 | 1.61 | 1.61 | 1.61 |
| Crosslinking agent | 1.03 | 1.06 | 1.30 | 1.30 | 1.30 |
| Crosslinking booster | 1.06 | 1.32 | 1.61 | 1.61 | 1.61 |
| Properties | Test method | | | | |
| Flow index (g/10 min) | ASTM D-L328 21.6 kg at 190° C. | 86 | 48 | 159 | 111 |
| GOTTFERT ™ test | see below | 2496 | 2581 | 1981 | 2191 |
| Fluid resistance | MIL-C-24643 | 52/76 | 51/109 | 50/91 | 59/74 |
| UL-1685 | see below | Fail | Pass | Pass | Pass |
| LOI(limited oxygen index) | ASTM D-28M | 33 | 30 | 29 | 31 |
| T/E | ASTM D-638 | 2461/199 | 1436/303 | 1430/220 | 1732/216 |

TABLE-continued

| | | Examples | | | |
|---|---|---|---|---|---|
| | | 1 | 2 | 3 | 4 |
| | | | parts by weight | | |
| % retained T/E | ASTM D-638 | 106/104 | 103/83 | 104/111 | 126/92 |
| Tear strength | ASTM D-470 | 31 | 65 | 69 | 62 |
| Hardness (Shore A) | ASTM D-2240 | 86 | 85 | 84 | 92 |
| Flexural modulus (psi) | ASTM D-790 | 16,522 | 10,342 | 7,739 | 16,128 |

Notes to Table:
1. The GOTTFERT ™ test is carried out on the GOTTFERT ™ tester at 120° C. and 180 s$^{-1}$. It is measured in pascal-second (Pa-sec). The Gottfert tester is a high pressure capillary rheometer. The molten polymer is forced by pressure form a reservoir through a capillary. The shear rate and stress at the wall of the capillary are calculated from the measurement of the volumetric flow rate, pressure drop, and the radius and length of the capillary. The viscosity is obtained by dividing the shear stress by the shear rate.
2. The fluid resistance test is carried out at 50° C. for 24 hours on a cured plaque sample. The result is given in percent retained tensile strength (T, the first number) and percent retained tensile elongation (E, the second number). MIL-C stands for Military Specification. The minimum % retained tensile and elongation after immersed in selected fluids at 50° C. for 24 hours is 50% for the shipboard tray cable applications.
3. UL-1685 is the vertical flame test for tray cables. It is carried out on a 14 AWG (American Wire Gauge) copper wire coated with the above formulations. The thickness of the coating is 45 mils.
4. T/E (psi/%) = T stands for tensile strength and is measured in psi and E stands for tensile elongation and is measured in percent.
5. % retained T/E = a sample is aged at 136° for 24 hours. The first number is the percent retained tensile strength and the second number is the percent retained tensile elongation.
6. The tear strength is measured on a 75 mil thick sample. The result is given in pound feet per inch.

We claim:
1. A composition comprising:
(a) one or more crosslinked ethylene/vinyl acetate copolymers, each copolymer having a vinyl acetate content in the range of about 10 to about 40 percent by weight based on the weight of the copolymer and an average melt index in the range of about 1 to about 50 grams per 10 minutes; and, for each 100 parts by weight of component (a),
(b) as a coupling agent, about 5 to about 85 parts by weight of a terpolymer of ethylene, an acrylic acid ester, and an anhydride of an unsaturated diacid containing about 0.5 to about 5 parts by weight of the anhydride per 100 parts by weight of terpolymer; and
(c) about 135 to about 370 parts by weight of a hydrated inorganic flame retardant filler.
2. The composition defined in claim 1 wherein
(a) each ethylene/vinyl acetate copolymer has a vinyl acetate content in the range of about 15 to about 35 percent by weight based on the weight of the copolymer and an average melt index in the range of about 1 to about 50 grams per 10 minutes; and, for each 100 parts by weight of component (a),
(b) there are about 10 to about 30 parts by weight of the terpolymer, and the terpolymer contains about 1 to about 4 parts by weight of the anhydride; and
(c) about 150 to about 350 parts by weight of the filler.
3. The composition defined in claim 1 wherein there are two different ethylene/vinyl acetate copolymers.
4. The composition defined in claim 1 wherein the anhydride is maleic anhydride.
5. The composition defined in claim 1 wherein the filler is magnesium hydroxide, alumina trihydrate, hydrated calcium silicate, hydrated calcium carbonate, or basic magnesium carbonate.
6. The composition defined in claim 5 wherein the filler is alumina trihydrate.
7. A composition comprising:
(a) two different crosslinked ethylene/vinyl acetate copolymers, each copolymer having a vinyl acetate content in the range of about 15 to about 35 percent by weight based on the weight of the copolymer and an average melt index in the range of about 1 to about 50 grams per 10 minutes; and, for each 100 parts by weight of component (a),
(b) as a coupling agent, about 10 to about 30 parts by weight of an ethylene/acrylic acid ester/maleic anhydride terpolymer containing about 1 to about 4 parts by weight maleic anhydride, the parts by weight of the anhydride being based on 100 parts by weight of terpolymer; and
(c) about 180 to about 225 parts by weight of alumina trihydrate.
8. An article of manufacture comprising an electrical conductor or communications medium surrounded by one or more layers of the composition defined in claim 1.
9. The article of manufacture defined in claim 8 comprising a communications medium made up of one or more glass fibers.

* * * * *